Dec. 17, 1968
R. STUFFER
3,416,326
EFFICIENT NITROGEN TRAP
Filed June 2, 1967
2 Sheets-Sheet 1
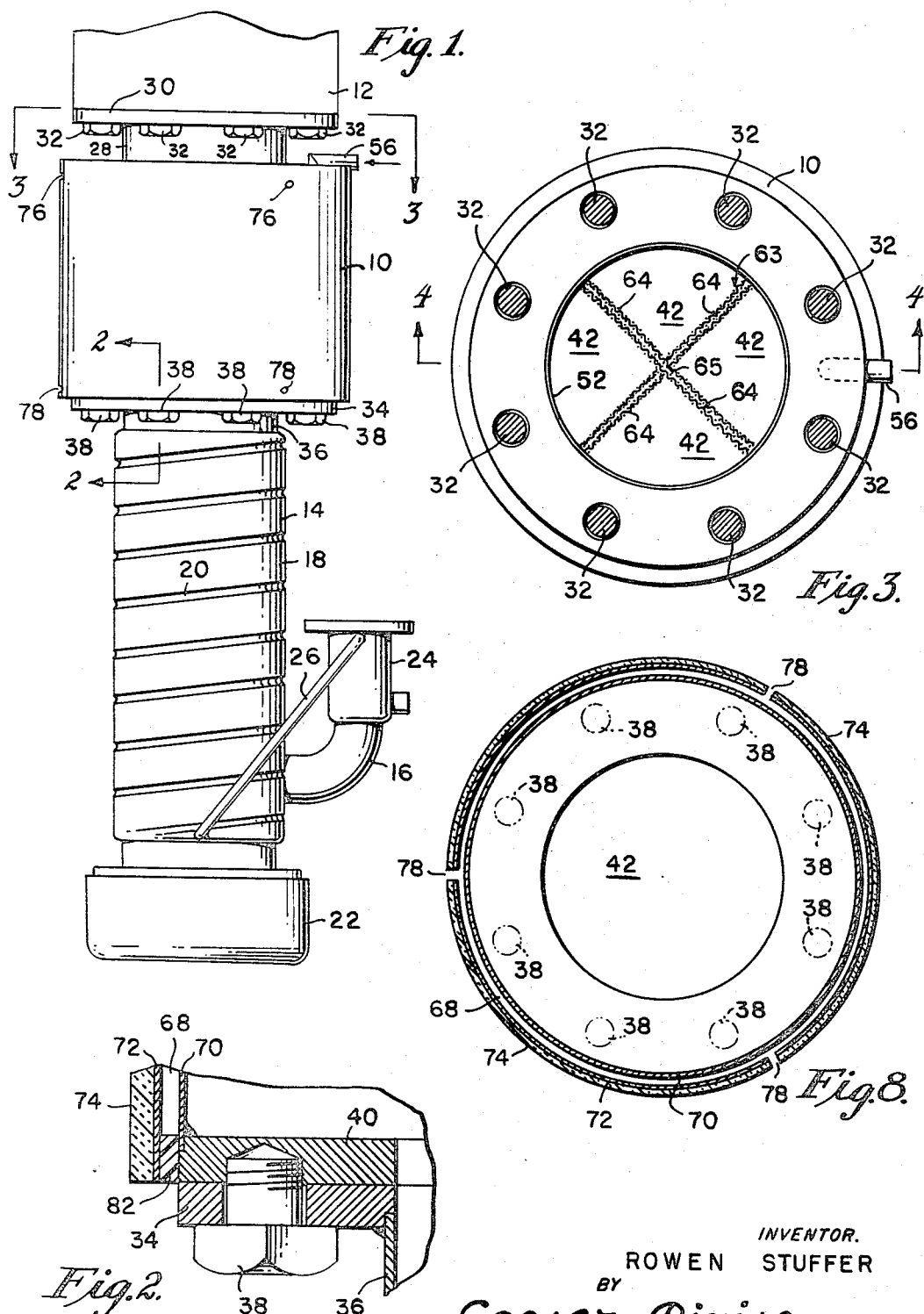
INVENTOR.
ROWEN STUFFER
BY
Caesar, Rivise,
Bernstein & Cohen
ATTORNEYS.

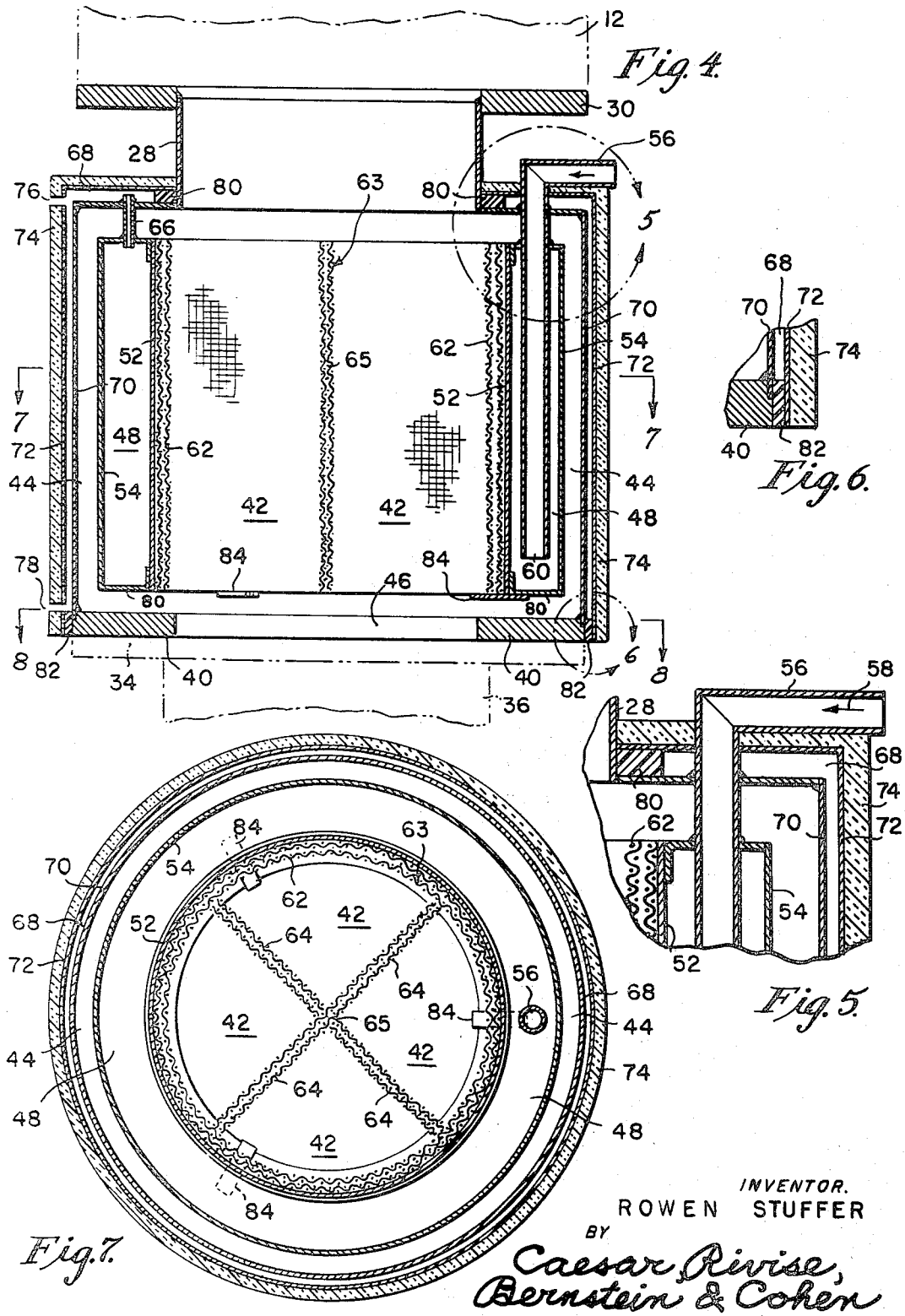

United States Patent Office 3,416,326
Patented Dec. 17, 1968

3,416,326
EFFICIENT NITROGEN TRAP
Rowen Stuffer, 20 Glenview Lane,
Willingboro, N.J. 08046
Filed June 2, 1967, Ser. No. 643,092
7 Claims. (Cl. 62—55.5)

ABSTRACT OF THE DISCLOSURE

An efficient nitrogen trap having a central through opening maintained at a very low temperature, the through opening being defined by metallic mesh of good thermal conductivity in good thermal contact with extremely cold portions of the trap which are maintained at a very low temperature by virtue of the evaporation of internally housed liquid nitrogen, the mesh also extending into the through opening but not completely closing said opening.

---

This invention relates to an efficient nitrogen trap and has as its objective the provision of a new and highly efficient device of this general class.

It is known to use a nitrogen trap in a high vacuum system for the purpose of removing condensable gases from such system by providing an extremely cold surface which the condensable gases are caused to flow past, with such cold surface being maintained at a temperature below the condensation point of such gases. A preferred usage of the nitrogen trap is to interpose the trap between the chamber to be evacuated and an oil diffusion pump. In this way any condensable gases not liquefied by the trap as well as the noncondensable gases emerging from the trap are acted upon by the downstream oil diffusion pump.

The nitrogen traps heretofore used have usually consisted of a can type construction with the gases flowing about the can. While cooling baffles have been suggested, such baffles usually provide unacceptable impedence to gas flow which lowers the pumping speed to an undesirable level.

It is therefore an object of the present invention to provide an efficient nitrogen trap wherein the condensing effect of the jacket is efficiently distributed across the flow of gases, with gaseous flow occurring mainly through the reservoir.

Yet another object of the present invention is to provide an efficient nitrogen trap which does not substantially impede pumping speed but at the same time provides a cooling area in a plane which is parallel, inclined or perpendicular or a combination of planes in varying relation to the direction of the flow of gases.

Yet another object of the present invention is to provide an efficient nitrogen trap which affords easy maintenance and which is relatively simple in construction.

The foregoing as well as other objects of the invention are achieved with the provision of an efficient nitrogen trap including a central through area permitting the passage of gases being drawn from a high vacuum chamber with such central area being provided in a liquid nitrogen reservoir which receives liquid nitrogen that is permitted to boil off with such reservoir thereby being a source of extreme cold. Metallic mesh means, such as aluminum mesh is positioned about the central opening and in contact with the inner wall of the nitrogen reservoir so that the extreme cooling effect of the reservoir is conducted to the metallic mesh means. Since the metallic mesh preferably extends across the through area in a network, the extreme cooling effect of the reservoir is conveyed completely across the through opening and in the path of gases being drawn from the high vacuum chamber. There is also an outer annular area which is located outwardly of the nitrogen reservoir which permits the passage of a certain proportion of gases wherein condensation can also take place. The nitrogen vapors are led to an outer chamber that is located closely adjacent to the housing of the trap in order to provide a cooling effect at the housing and in this way eliminate the creepage of oil from a downstream oil diffusion pump.

Other objects and many of the attendant advantages of this invention will be readily appreciated as the same becomes better understood by reference to the following detailed description when considered in connection with the accompanying drawings wherein:

FIG. 1 is a fragmentary side elevation view showing the nitrogen trap of the present invention interposed between a chamber where high vacuum is to be maintained and an oil diffusion pump;

FIG. 2 is an enlarged sectional view taken along the lines 2—2 of FIG. 1;

FIG. 3 is an enlarged sectional view taken along the lines 3—3 of FIG. 1;

FIG. 4 is a fragmentary sectional view taken along the lines 4—4 of FIG. 3;

FIG. 5 is an enlarged view within the circular area of the arrow 5 of FIG 4;

FIG. 6 is an enlarged view within the circular arrow 6 of FIG. 4;

FIG. 7 is a sectional view taken along the lines 7—7 of FIG. 4; and

FIG. 8 is a sectional view taken along the lines 8—8 of FIG. 4.

Referring now in greater detail to the various figures of the drawing wherein like reference characters refer to like parts there is shown at FIG. 1 at 10 a liquid nitrogen trap embodying the present invention, interposed between high vacuum chamber 12 and oil diffusion pump 14. The chamber 12 is where a high vacuum is to be maintained. The chamber 12 is upstream of the trap 10 with the oil diffusion pump 14 being downstream of the trap 10.

As further shown in FIG. 1 a foreline 16 is provided which connects to a mechanical vacuum pump (not shown) which is downstream of the oil diffusion pump 14. It is therefore seen in accordance with conventional practice in the art that the action of the mechanical vacuum pump initiates a flow of gases away from chamber 12 and into the nitrogen trap 10, with the gases then passing through diffusion pump 14 finally being drawn through foreline 16 into the mechanical vacuum pump.

The nitrogen trap 10 is designed to be maintained at a very low temperature, substantially at the boiling point of liquid nitrogen in order to condense virtually all condensable materials in the gaseous vapor that are being evacuated from chamber 12. Any condensables as well as the non-condensables passing beyond the trap 10 are then acted upon by the diffusion pump 14.

While the details of construction of various oil diffusion pumps will occur to those skilled in the art, it is to be noted that the oil diffusion pump of pending application Ser. No. 524,513, filed Feb. 2, 1966 is eminently suited to operate downstream of the trap 10. While the details of the oil diffusion pump 14 are set forth in said co-pending application Ser. No. 524,513, and need not be elaborated upon, it should be noted that FIG. 1 shows a water jacket 18 with spiral corrugations 20 in order to avoid channeling and hot spots in the water moving through water jacket 18. The oil of the diffusion pump 14 is heated by means of a boiler contained within boiler housing 22, and the foreline 16 is cooled by a water jacket 24 with line 26 being used to connect the water jackets 20 and 24.

As shown in FIG. 4 the trap 10 possesses an upper neck portion 28 to which is welded a flange 30 so that bolts 32 (FIG. 1) can be utilized to secure in an airtight manner (using appropriate seals) the trap 10 to area 12. The trap 10 is secured at its lower portion to diffusion pump 14 by a similar flange 34 (FIGS. 1 and 4) extending from neck portion 36 of the diffusion pump 14 (FIG. 2) with bolts 38 passing through the flange 34 and into lower wall 40 of trap 10.

As further shown in FIG. 4 the trap possesses both a central through area 42 as well as an outer area 44. It is seen that gases passing downwards from chamber 12 will mainly pass through the central through area 42, but a certain portion of the gases will also flow through outer area 44. The uncondensed gases emerging from area 44 rejoin the main stream of gases emerging from the bottom of the central area and then pass through opening 46 in lower wall 40 to enter neck portion 36 of diffusion pump 14.

It is seen from FIG. 4 that the areas 42 and 44 are separated by an annular liquid nitrogen receiving reservoir 48. It can be seen that the nitrogen reservoir 48 includes a cylindrical inner wall 52 and a cylindrical outer wall 54. Nitrogen is fed into the reservoir 48 through inlet line 56 in the direction of arrow 58 (FIG. 5) with the nitrogen entering the can at lower discharge opening 60 in the line 56.

As is further shown in FIG. 4 a layer of metallic mesh 62 (preferably aluminum or copper) is disposed adjacent the inner surface of the inner wall 52. The outer metallic mesh layer 62 is actually a portion of metallic mesh network 63 as better shown in FIG. 7 and which will be discussed in detail hereinafter. However, it is clear that the condensing effect of the boiling liquid nitrogen in reservoir 48 is immediately transferred through inner head conductive wall 52 to the metallic mesh 62. This cooling effect is further transferred by conduction into the metallic mesh side branches 64 (FIG. 7) and central branch 65 (FIG. 4) in order to present a tremendous amount of very cold (good heat conductive) area in the path of the gases being drawn from high vacuum chamber 12, but without substantially impeding the air flow or without adversely affecting the pumping speed of the system.

As further seen in FIG. 4 gases passing into outer area 44 are subjected to the condensing action through outer wall 54 of reservoir 48 and also by contact with wall 70. Because of the relative narrowness of area 44 satisfactory condensation is obtained.

With further reference to FIG. 4, nitrogen vapors are permitted to escape from the reservoir by passing upwardly through a vent 66 that connects the reservoir 48 to an outer chamber 68. As is further shown in FIGS. 4 and 7 the outer chamber 68 is defined by an inner metallic wall 70 and outer metallic housing 72 with the outer chamber 68 being annular in configuration. The outer chamber 68 is thermally insulated by insulation 74 which may be a foamed material, and furthermore, the outer surface of outer housing 72 is preferably coated with a reflective material prior to the application of the insulation 74 in order to radiate away any external heat that might otherwise be conducted to the interior of the nitrogen trap.

The insulation 74 is present also to prevent the condensation of external water vapor which is commonly known as "sweating." Venting ports 76 are provided through insulation 74 and housing 72 in order to permit the escape of nitrogen vapor. Drain openings 78 are also provided through insulation 74 and housing 72 adjacent lower flange 40 to provide for the situation where the entire reservoir 48 becomes filled with liquid nitrogen which then overflow through vent 66 into chamber 68. In this case liquid nitrogen would simply drain through opening 78 instead of building up in jacket 68, although in use, it is intended that jacket 68 contain only vapors. The cold vapors will cool the outer surface of wall 70 to prevent oil migration or "creep."

As further shown in FIG. 4 the inlet pipe 56 extends downwardly through the reservoir 48 to a point closely adjacent to its bottom 80. This construction is preferred to permit a satisfactory blowout using compressed air. As a further option in the present invention the interior surface of inner wall 52 may be covered with a black substance to absorb any heat which may be radiated from central area 42.

Reference is now made to the metallic mesh network 63 as shown in FIGS. 4 and 7. While the metallic mesh network 63 may have various configurations, it should be clear that the present invention contemplates in its preferred form that a minimum amount of resistance to gaseous flow be offered. However, it is to be understood that the present invention is sufficiently broad to contemplate a situation where the metallic mesh covers a substantial portion of the central area 42 or the outer area 44 or both or even that the metallic mesh may be present in varying horizontal, vertical or inclined layers partially or completely covering the central area 42 or the outer area 44 or both or that the mesh will be present in inclined layers affording a partial or complete coverage.

Instead, it is to be understood that with the present invention the great cooling capacity of the liquid nitrogen is conveyed to the central area of the trap by conductance through the metallic mesh means, and in this way the tremendous cooling capacity of the liquid nitrogen is brought to the center of the trap directly in the path of gaseous flow where such tremendous cooling capacity is most effective upon the condensable materials.

As shown in FIGS. 4 and 7 the metallic mesh network 63 basically comprises an outer cylindrical mesh layer 62 which is preferably in actual or good thermal contact with interior wall 52 of reservoir 48 such that the cooling capacity of the nitrogen reservoir 48 is immediately transmitted through the wall 52 and to the mesh network 62. The network side branches 64 convey such cooling capacity to the center of the trap with generally vertical central branch 65 enhancing the efficiency of the thermal circuit. Where desired the metallic mesh means may also be present in a plurality of layers as suggested in FIGS. 4 and 7.

Other details are upper seals 80, lower seals 82, and structural support 84 (FIG. 7) for proper support of the mesh network.

It is to be understood that materials other than liquid nitrogen may be employed in reservoir 48, and that metals other than aluminum and copper may be utilized in the metallic mesh. Furthermore, the metallic mesh may take varying woven and non-woven forms with the objective being to provide a relatively large amount of surface area in a relatively small volume. In this way the condensing capacity of the liquid nitrogen is made available over a relatively large area of relatively low volume and therefore of little hinderance to gaseous flow. The metallic mesh is in part in actual physical contact with interior wall 52 of reservoir 48. This allows heat transfer to take place by conduction from the mesh to the interior of the reservoir 48.

It is thus seen that the metallic mesh is in effect a surface cold trap affording a relatively large surface. Thus the cold trap of the present invention becomes a pump in itself. The metallic mesh network 63 as illustrated in FIGS. 4 and 7 offers many times the surface area as compared with a conventional trap. With this large increase in surface area, pumping speed is increased many times since the cold trap of the preferred embodiment of the present invention is not blind.

It is therefore seen that the present invention provides an effective construction whereby the tremendous cooling capacity of the liquid nitrogen reservoir 48 is conveyed into the main stream of gaseous flow, where such condensing capacity is most needed. The present invention also affords the additional advantage of preventing encroachment of oil vapor that may have worked its way up from the oil diffusion pump.

While the preferred embodiment of the present invention has been described in terms of providing a liquid nitrogen reservoir 48 which defines a generally circular cross section for gaseous flow, it is clear that other configurations and arrangements will occur to those skilled in the art. The present invention contemplates the provision of means providing an extremely cold surface surrounding the path of the gaseous flow. In the preferred embodiment of the present invention the metallic mesh extends from a wall that is generally parallel to the path of gaseous flow. However, it is quite clear that the metallic mesh of the present invention may also extend from walls or surfaces which have an inclined angle or even perpendicular to the path of gaseous flow.

Without further elaboration, the foregoing will so fully illustrate my invention, that others may, by applying current or future knowledge, readily adapt the same for use under various conditions of service.

What is claimed as the invention is:

1. In a nitrogen trap having an area through which there is a gaseous flow including condensables, and means providing an extremely cold surface adjacent said gaseous flow, said cold surface being the wall of a reservoir having means to permit the introduction of a liquid with an extremely low boiling point, the improvement comprising providing said cold surface about a central through opening permitting the passage of said gaseous flow, metallic mesh of good thermal conductivity in good thermal contact with said wall, said mesh extending into said central through opening, but not completely closing said opening, whereby said metallic mesh provides a relatively large surface area in a relatively small volume to convey the condensing effects of said extremely cold surface to said gaseous flow without substantially impeding said gaseous flow.

2. The invention of claim 1 wherein said metallic mesh is present in the form of a network including an outer metallic mesh layer having a generally cylindrical configuration which is in actual contact with a wall of said reservoir, said metallic mesh network further includes side branches extending into said central through area and terminating in a central branch.

3. The invention of claim 2 wherein a portion of said gaseous flow may follow a path outwardly of said reservoir and away from said central area so as to be adjacent the outer housing of said trap with said reservoir having an outer wall which serves to convey the cooling capacity of said liquid to the gaseous flow moving in said path.

4. The invention of claim 2 wherein said reservoir includes venting means to permit the escape of cooling liquid and gas from said reservoir, said venting means leading to an outer chamber located closely adjacent to the pump housing to provide an extremely cold effect in said housing whereby encroachment of oil vapor from an oil diffusion pump is retarded.

5. The invention of claim 4 including a vent opening in said chamber to allow exhaust of said reservoir cooling gases, said chamber also having a drain opening to permit the escape of any condensing liquid in said chamber.

6. The invention of claim 2 wherein the material fed to said reservoir is liquid nitrogen.

7. The invention of claim 2 wherein said metallic mesh is made of aluminum.

References Cited

UNITED STATES PATENTS

| | | | |
|---|---|---|---|
| 3,137,551 | 6/1964 | Mark | 62—55.5 |
| 3,220,167 | 11/1965 | Van Der Ster et al. | 62—55.5 |

LLOYD L. KING, *Primary Examiner.*